July 7, 1970  A. PENNANEN  3,519,011
REPLENISH AND RELIEF VALVE
Filed March 4, 1968  2 Sheets-Sheet 1

INVENTOR.
ARNOLD PENNANEN
BY
ATTORNEY

United States Patent Office 3,519,011
Patented July 7, 1970

3,519,011
REPLENISH AND RELIEF VALVE
Arnold Pennanen, Ossineke, Mich., assignor, by mesne assignments, to Scovill Manufacturing Company, Waterbury, Conn.
Filed Mar. 4, 1968, Ser. No. 710,193
Int. Cl. G05d 7/00
U.S. Cl. 137—102                            3 Claims

ABSTRACT OF THE DISCLOSURE

A replenish and relief valve for controlling air pressure supplied to a die cushion wherein a movable piston having an axial passageway therethrough positions a movable plunger therein, the movable plunger having an axial passageway partly therethrough and a closed end forming a valve element with respect to the axial passageway in said piston, the relatively different diameters of said piston and said plunger acting when subjected to varying air pressures from the opposite ends of the valve to bias said piston and said plunger to locations providing air flow through said valve in one direction and air flow into said valve from another direction and outwardly therefrom through a vent port.

---

The replenish and relief valve for die cushions and similar air cushion cylinders disclosed herein is particularly useful in maintaining a desired air pressure in a die cushion or the like with respect to a supply source and venting excess pressure from said die cushion when the same is operating and subsequently replacing such vented air during the continuing operating cycles of said die cushion.

The principal object of the invention is the provision of a replenish and relief valve for a die cushion and the like which will automatically supply air from a supply source to the die cushion and automatically vent excess pressure from said die cushion upon the same occurring and automatically recycle to resupply said die cushion as needed.

A further object of the invention is the provision of a replenish and relief valve for a die cushion and the like that may be simply and easily manufactured and installed in an air supply line establishing communication between an air supply and a die cushion.

A further object of the invention is the provision of a replenish and relief valve for a die cushion or other similar pneumatic device and incorporating dual movable valve elements controlling three passageways, each of said valve elements being responsive in operation to differential air pressures thereon and to the selective positioning of the other.

A still further object of the invention is the provision of a replenish and relief valve for a die cushion of the like and wherein automatic air supply to said die cushion is achieved to a predetermined pressure and automatic venting of excess pressures obtained through the incorporation of dual valve elements movable by air pressure in the replenish and relief valve and wherein size differential of said valve elements occasions automatic movement and operation of said replenish and relief valve.

The replenish and relief valve for die cushions and similar devices, as disclosed herein, comprises a simple and economic solution to a problem of maintaining desired to air pressures in a die cushion or the like and providing for the venting of excess pressures therefrom as occurs when the die cushion is operated as well as the subsequent replenishment of the air vented.

In many pneumatic devices, compressed air is utilized as a cushioning agent and depending upon the position of the respective parts of the device the air is subjected to a greater or a lesser degree of compression with the resulting changes in pressure therein. Those skilled in the art will recognize that certain operating pressures in die cushions are desirable and that excess pressures are undesirable and dangerous and further that the immediate re-establishment of proper operating pressures in a die cushion after excess pressures have been vented therefrom is highly important.

The replenish and relief valve disclosed herein accomplishes the automatic control of these functions.

The invention is illustrated in the accompanying drawing, wherein.

Figure 1:
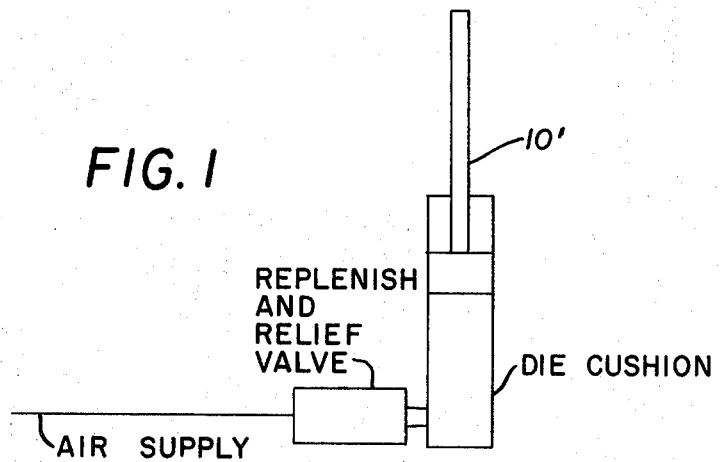
FIG. 1 is a schematic diagram showing a die cushion and the replenish and relief valve in communication therewith and with an air supply source.

By referring to the drawing and FIG. 1 in particular, it will be seen that a schematic diagram illustrating a die cushion, a replenish and relief valve and an air supply have been shown. The die cushion is shown with a die support member 10' extending upwardly and outwardly thereof and it will occur to those skilled in the art that the air pressure in the die cushion chamber will vary in pressure depending on the location of said die support member. In order that a desired air pressure may be maintained in the die cushion, the replenish and relief valve operates to control air from the air supply to the die cushion chamber and to vent excess pressure from the die cushion chamber.

Figure 2:
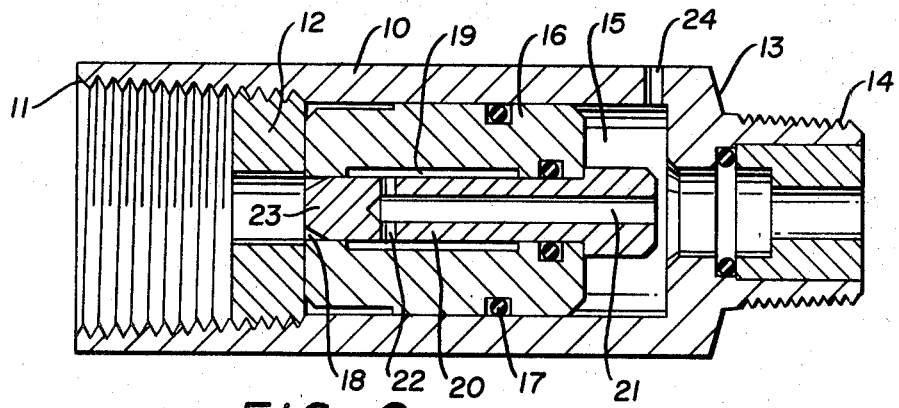
FIG. 2 is a vertical section through the replenish and relief valve.

By referring to FIG. 2 of the drawings, it will be seen that the replenish and relief valve comprises a cylindrical housing 10 having an internally threaded inlet end portion 11 with an apertured externally threaded disc 12 engaged therein and forming a transverse wall with respect to the cylindrical housing 10. The opposite end of the cylindrical housing 10 has an integrally formed end wall 13 with an externally threaded tubular extension 14 communicating therewith. The area between the apertured disc 12 and the end wall 13 comprises a chamber 15 in which a piston valve 16 is slidably mounted. O-ring gasket 17 is provided around the exterior surface of the piston valve 16 to seal the same relative to the inner walls of the cylindrical housing 10. An axially extending passageway 18 is formed in the piston valve 16 and the central area of the passageway 18 is enlarged as at 19. A plunger 20 is movably positioned in the axially extending passageway or bore 18 and a longitudinally extending passageway 21 is formed in the plunger 20 and extends from one end thereof, the right end, as seen in FIG. 2 of the drawings, to a transverse passageway 22 also located in the plunger 20 and inwardly from the opposite or left end thereof as seen in FIG. 2.

Figure 3:
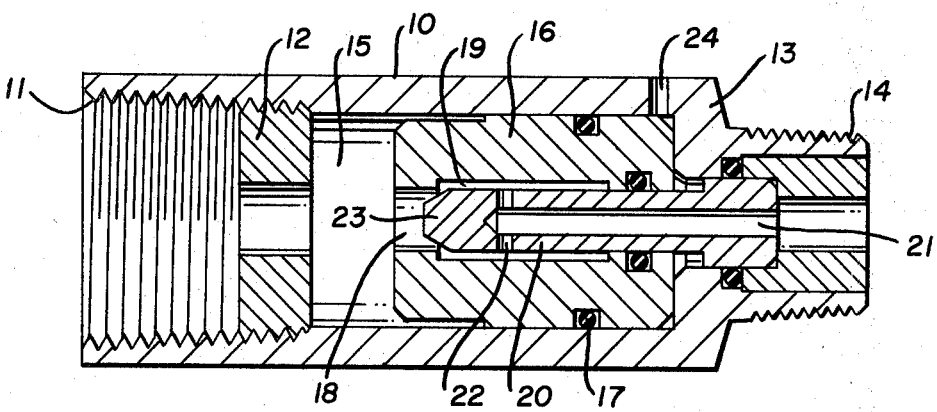
FIG. 3 is a vertical section through the replenish and relief valve showing the same with air being supplied at its inlet end and the valve elements therein open and air flowing therethrough and out of its outlet end to said die cushion.
Figure 4:
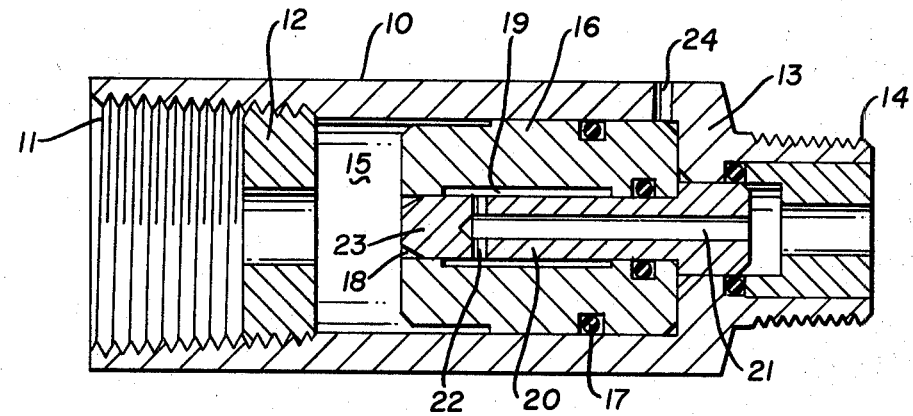
FIG. 4 is a vertical section of the replenish and relief valve showing the operation of the same when the air pressures on the inlet and outlet ends of the valve have balanced and both valve elements are in closed position with respect to all passageways in said replenish and relief valve.
Figure 5:
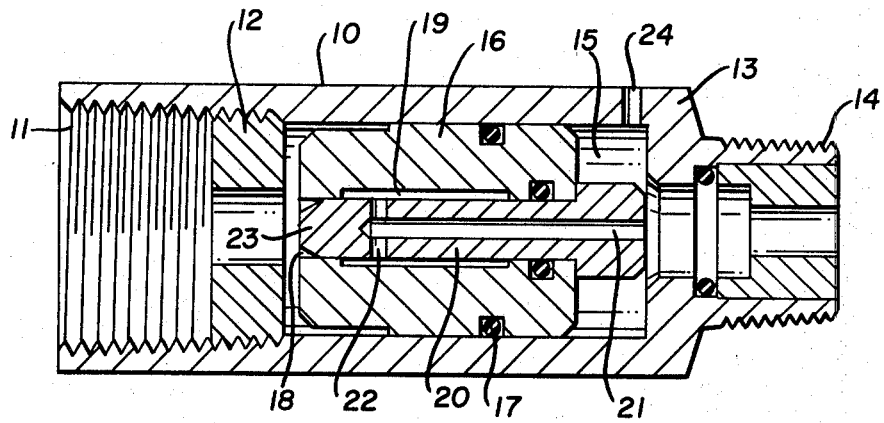
FIG. 5 is a vertical section of the replenish and relief valve showing the operation of the same when excess pressures have occurred in the die cushion in communication with its outlet end and one of the valve elements has moved to vent such excess pressures and the other has moved to close the inlet passageway.

By referring to the construction just described, it will be seen that assuming there is no air pressure in the die-cushion and air pressure exists in the air supply in communication with the inlet end 11 of the valve, air will move inwardly and engage the closed end of the plunger 20. This closed end acts as a valve element 23 with respect to the axially extending passageway 18 in the piston valve 16 and it will be seen by referring to FIG. 3 of the drawings that when the air pressure builds up in the left end of the chamber 15 it will move the piston valve 16 to the right and also move the plunger 20 to the right to the positions shown in FIG. 3. In this position air will flow freely into the inlet end 11 through the chamber 15 and through the axially extending passageway 18, the enlarged portion 19 thereof, into the transverse passageway 22 in the plunger 20 and then through the longitudinally extending passageway 21 therein and out of the tubular end portion 14 where it communicates with the die cushion. Air pressure will thus be rapidly supplied to the die cushion chamber. It will thus be seen that air continues to flow into the die cushion until the pressure in the die cushion approaches that of the inlet air pressure from the air supply. Under such conditions, the larger diameter at the die cushion end of the plunger 20 creates a force which moves the plunger 20 to the left to the position shown in FIG. 4 of the drawings where the end thereof forming the valve element 23 registers with the axially extending passageway 18 and effects a closure. Those skilled in the art will observe that external forces on the die cushion such as conveyed thereto through the member 10 in FIG. 1 of the drawings can create a pressure intensification in the cushion equal to the inlet air pressure times the ratio of the area of the piston to the area of the large diameter of the plunger and it will further be obvious that if the pressure developed in the cushion exceeds the pressure intensification just described, the plunger 20 and the piston valve 16, will move together until the excess air from the die cushion is allowed to escape from a vent orifice 24 in the cylindrical housing 10. Thus, it will be seen that the replenish and relief valve operates automatically to build up the desired pressure in the die cushion and upon reaching that desired pressure, closes to confine the same and permit normal operation of the die cushion and that upon excess pressure being generated in the die cushion, the replenish and relief valve operates to vent said excess pressure. Upon the venting of of such excess pressure, the change in the pressure on the differential ends of the plunger 20 will again permit air supply to flow thereinto and the removal of air supply from the inlet end 11 of the replenish and relief valve will move both the plunger 20 and the piston valve 16 to the extreme left and permit venting of all of the air pressure in the die cushion. Thus, by controlling the air supply, the complete and satisfactory operation of the die cushion is achieved. The position of the replenish and relief valve piston valve 16 and plunger 20 upon reaching an equalization point is shown in FIG. 4 of the drawings and in FIG. 5 of the drawings, the position of the piston valve 16 and the plunger 20 are shown venting excess pressure.

It will thus be seen that the replenish and relief valve includes dual valve parts which are the piston valve 16 and the plunger 20 therein and that by reason of varying pressures on the respective parts the same move to accomplish the desired results.

It will thus be seen that a replenish and relief valve for die cushions and the like has been disclosed which meets the several objects of the invention and having thus described my invention, what I claim is:

1. A replenish and relief valve comprising a housing have a chamber provided with an inlet port communicating with one end of said chamber, an outlet port communicating with the other end of said chamber and a vent port between said inlet and outlet ports communicating with said chamber, a piston valve movable in said chamber, a plunger having first and second valve elements on its opposite ends movably positioned in an axial passageway in said movable piston valve, said first valve element extending outwardly of one end of said piston valve and being registrable with said outlet port in a first and a second position of said replenish and relief valve and free of said outlet port in a third position of said replenish and relief valve, said passageway in said piston valve having an enlarged area inwardly of its ends, said second valve element on said plunger extending into said enlarged area of said passageway, a bore in said plunger extending through said first valve element and opening through the sides of said plunger inwardly from the second valve element thereof so as to communicate with said enlarged area in said passageway, said second valve element on said plunger being registrable with said passageway in said second and third positions and positioned in said enlarged area of said passageway in said first position so as to control communication between said bore and the other end of said piston valve, said piston valve being registrable with said vent port in said chamber in said first and second positions and free of said vent port in said third positions so as to control communication therethrough.

2. The replenish and relief valve set forth in claim 1 and wherein the inlet port and the outlet port and the passageway are axial of said housing and piston valve and said bore is axial of said plunger.

3. The replenish and relief valve set forth in claim 1 and wherein said vent port is located in a side of said housing perpendicular to said bore.

References Cited
UNITED STATES PATENTS

| | | | |
|---|---|---|---|
| 2,367,682 | 1/1945 | Kehle | 137—102 X |
| 2,670,751 | 3/1954 | Wilson | 137—107 |
| 2,969,806 | 1/1961 | Jensen et al. | 137—107 X |
| 3,034,527 | 5/1962 | Hennells | 137—102 |
| 3,090,307 | 5/1963 | Niekrasz | 137—107 X |
| 3,358,928 | 12/1967 | Melendy | 137—107 X |

WILLIAM F. O'DEA, Primary Examiner

D. J. ZOBKIW, Assistant Examiner

U.S. Cl. X.R.

137—508, 627.5